(12) United States Patent
Barlier et al.

(10) Patent No.: US 7,920,937 B2
(45) Date of Patent: Apr. 5, 2011

(54) MECHANICAL COMPONENT HAVING AT LEAST ONE FLUID TRANSPORT CIRCUIT AND METHOD FOR DESIGNING SAME IN STRATA

(75) Inventors: Claude Barlier, Coinches (FR); Cyril Pelaingre, Saint Die (FR); Denis Cunin, Les Poulieres (FR); Christophe Levaillant, Albi (FR)

(73) Assignee: Cirtes SRC, SA Cooperative d'Ues, Saint Die des Vosges (FR)

( * ) Notice: Subject to any disclaimer, the term of this patent is extended or adjusted under 35 U.S.C. 154(b) by 551 days.

(21) Appl. No.: 10/530,504

(22) PCT Filed: Jul. 15, 2003

(86) PCT No.: PCT/FR03/02224
§ 371 (c)(1),
(2), (4) Date: Apr. 6, 2005

(87) PCT Pub. No.: WO2004/034165
PCT Pub. Date: Apr. 22, 2004

(65) Prior Publication Data
US 2005/0278928 A1  Dec. 22, 2005

(30) Foreign Application Priority Data
Oct. 7, 2002 (FR) ...................... 02 12389

(51) Int. Cl.
*G06F 19/00* (2006.01)
(52) U.S. Cl. .................. 700/119; 700/98; 700/197
(58) Field of Classification Search .......... 700/118, 700/119, 98, 197; 264/494; 204/601
See application file for complete search history.

(56) References Cited

U.S. PATENT DOCUMENTS

| | | | |
|---|---|---|---|
| 2,428,658 A | 10/1947 | Falk et al. |
| 2,477,060 A | 7/1949 | Hudak |
| 2,479,191 A | 8/1949 | Williams et al. |
| 2,615,111 A | 10/1952 | Paquette et al. |
| 3,039,146 A | 6/1962 | Engel |
| 3,369,272 A | 2/1968 | Martin, Jr. et al. |
| 3,612,387 A | 10/1971 | Rathbun |
| 3,790,152 A | 2/1974 | Parsons |

(Continued)

FOREIGN PATENT DOCUMENTS
DE      3711470      10/1988
(Continued)

OTHER PUBLICATIONS

Choi et al., "Design and Evaluation of a Laser-Cutting Robot for Laminated, Solid Freeform Fabrication", 2000 IEEE.*

(Continued)

*Primary Examiner* — Paul L Rodriguez
*Assistant Examiner* — Carlos Ortiz Rodriguez
(74) *Attorney, Agent, or Firm* — Gary M. Cohen (57) ABSTRACT

A mechanical part useful in various fields of application including plastic and metal processing is produced using a computer-aided design process including a preliminary break-down of the body of the part into elementary strata, followed by manufacture of the elementary strata, and reconstruction of the part. During break-down of the part, at least one fluid transport circuit, which is designed and modeled beforehand, is broken down into elementary chambers (20) in accordance with the break-down of the part. The elementary chambers are produced in the elementary strata ($7_i$) forming the part during manufacture of the strata, and the fluid transport circuit is reconstructed during superposition and assembly of the strata.

12 Claims, 4 Drawing Sheets

U.S. PATENT DOCUMENTS

| | | |
|---|---|---|
| 3,909,582 A | 9/1975 | Bowen |
| 3,932,923 A | 1/1976 | DiMatteo |
| 4,001,069 A | 1/1977 | DiMatteo |
| 4,250,727 A | 2/1981 | Baril et al. |
| 4,338,068 A | 7/1982 | Suh et al. |
| 4,586,690 A | 5/1986 | Härtel et al. |
| 4,601,652 A | 7/1986 | Ando et al. |
| 4,675,825 A | 6/1987 | DeMenthon |
| 4,752,352 A | 6/1988 | Feygin |
| 4,778,557 A | 10/1988 | Schirmer |
| 4,781,555 A | 11/1988 | Cook |
| 5,015,312 A | 5/1991 | Kinzie |
| 5,031,483 A | 7/1991 | Weaver |
| 5,354,414 A | 10/1994 | Feygin |
| 5,514,232 A | 5/1996 | Burns |
| 5,663,883 A | 9/1997 | Thomas et al. |
| 5,725,891 A | 3/1998 | Reid, Jr. |
| 5,765,137 A | 6/1998 | Lee |
| 5,775,402 A * | 7/1998 | Sachs et al. ............ 164/4.1 |
| 5,776,409 A | 7/1998 | Almquist et al. |
| 5,793,015 A | 8/1998 | Walczyk |
| 5,812,402 A | 9/1998 | Nishiyama et al. |
| 5,847,958 A | 12/1998 | Shaikh et al. |
| 5,943,240 A | 8/1999 | Nakamura |
| 6,021,358 A | 2/2000 | Sachs |
| 6,110,409 A | 8/2000 | Allanic et al. |
| 6,136,132 A | 10/2000 | Kinzie |
| 6,164,115 A | 12/2000 | Higuchi et al. |
| 6,276,656 B1 | 8/2001 | Baresich |
| 6,284,182 B1 | 9/2001 | McNally |
| 6,324,438 B1 | 11/2001 | Cormier et al. |
| 6,344,160 B1 | 2/2002 | Holtzberg |
| 6,358,029 B1 | 3/2002 | Niimi |
| 6,405,095 B1 | 6/2002 | Jang et al. |
| 6,409,902 B1 | 6/2002 | Yang et al. |
| 6,454,924 B2 * | 9/2002 | Jedrzejewski et al. ........ 204/601 |
| 6,544,024 B1 | 4/2003 | Yim |
| 6,554,882 B1 | 4/2003 | Zhou et al. |
| 6,617,601 B1 | 9/2003 | Wiklund |
| 6,627,030 B2 | 9/2003 | Yang et al. |
| 6,627,835 B1 | 9/2003 | Chung et al. |
| 6,688,871 B1 | 2/2004 | Lee et al. |
| 6,719,554 B2 | 4/2004 | Hobson |
| 6,728,591 B1 | 4/2004 | Hussey, Jr. et al. |
| 6,745,446 B1 | 6/2004 | Barlier |
| 6,756,309 B1 | 6/2004 | Chen et al. |
| 6,921,068 B2 | 7/2005 | Barlier et al. |
| 6,991,021 B2 | 1/2006 | Ramirez et al. |
| 7,003,864 B2 | 2/2006 | Dirscherl |
| 2002/0125613 A1 | 9/2002 | Cominsky |
| 2002/0149137 A1 * | 10/2002 | Jang et al. ............ 264/494 |
| 2002/0162940 A1 | 11/2002 | Frul et al. |
| 2002/0165634 A1 | 11/2002 | Skszek |
| 2003/0006001 A1 | 1/2003 | Yang et al. |
| 2003/0122277 A1 | 7/2003 | Padovani |
| 2003/0141609 A1 | 7/2003 | Jia |
| 2004/0173930 A1 | 9/2004 | Himmer et al. |
| 2004/0173951 A1 | 9/2004 | Hobson |
| 2004/0217497 A1 | 11/2004 | Engwall et al. |

FOREIGN PATENT DOCUMENTS

| | | |
|---|---|---|
| DE | 4041105 | 6/1992 |
| EP | 0585502 | 3/1994 |
| EP | 0606627 | 7/1994 |
| EP | 0655317 | 5/1995 |
| EP | 0655668 | 5/1995 |
| EP | 0738583 | 10/1996 |
| EP | 0763417 | 3/1997 |
| EP | 0811457 | 12/1997 |
| EP | 0920946 | 6/1999 |
| FR | 2233137 | 1/1975 |
| FR | 2625135 | 6/1989 |
| FR | 2673302 | 8/1992 |
| FR | 2750064 | 12/1997 |
| FR | 2789187 | 8/2000 |
| FR | 2789188 | 8/2000 |
| FR | 2808896 | 11/2001 |
| FR | 2809040 | 11/2001 |
| FR | 2834803 | 7/2003 |
| GB | 2011814 | 7/1979 |
| WO | WO/9112120 | 8/1991 |
| WO | WO/9508416 | 3/1995 |
| WO | WO/9900234 | 1/1999 |
| WO | WO 9911832 | 3/1999 |
| WO | WO/0222341 | 3/2002 |

OTHER PUBLICATIONS

Bocking et al. "Electrochemical Routes for Engineering Tool Production", The GEC Journal of Technology, vol. 14, No. 2, pp. 66 to 74 (1997).

T. Himmer et al. "Lamination of Metal Sheets", Computers in Industry, Elsevier Science Publishers, Amsterdam, Netherlands, vol. 39, No. 1, pp. 27-33 (Jun. 1999).

Patent Abstracts of Japan, vol. 016, No. 370 (M-1292) Published: Aug. 10, 1992 (pertaining to JP 04 118221 (Fujitsu Ltd.), published Apr. 20, 1992).

Patent Abstracts of Japan, vol. 1995, No. 11 Published: Dec. 26, 1995 (pertaining to JP 07 214274 (U Mold:KK), published Aug. 15, 1995).

T. Polito, "Comment Optimiser le Moulage des Plastiques", ("How to Optimize the Molding of Plastics"), Emballages Magazine, Jan.-Feb. 2002, Supplement No. 605, pp. 56 and 57.

* cited by examiner

MECHANICAL COMPONENT HAVING AT LEAST ONE FLUID TRANSPORT CIRCUIT AND METHOD FOR DESIGNING SAME IN STRATA

BACKGROUND OF THE INVENTION

The present invention relates to a mechanical part that includes at least one circuit for containing a fluid, and to a method for producing such a part.

The present invention is applicable to a broad range of fields such as, for example, mechanical engineering (for example, for the manufacture of cylinder heads), printing (for the production of ink-marking circuits), or other fields. In addition, the present invention preferably, but not exclusively, applies to the field of plastics processing, and more particularly, to the problems posed by the thermal regulation of molding tools (dies or punches).

The thermal regulation of an injection molding tool has the function of extracting thermal energy provided by the molten thermoplastic to the outside of the tool. Such energy is imparted to the thermoplastic by the plasticating screw to allow the thermoplastic to conform to the impression being made. Such energy must then be removed from the thermoplastic so the part can be ejected (without any "distortion" of the molding impression). Such extraction takes place under conditions defined beforehand, during the design of the part and of the tool.

The solution most commonly used to carry out the function of cooling and regulating molding tools is to produce a series of channels in the body of the tool, through which a heat-transfer fluid can circulate. The nature of the fluid depends on the desired average temperature in the tool.

To obtain optimally effective regulating channels, it is necessary for the channels to be able to form a layer facing the part, or which exactly follow the shape of the part, and for such channels to be separated from the part by as thin a wall as possible. In practice, this solution could not be achieved, both for technical reasons and because of the high mechanical stresses generated by the injection molding process.

A similar solution is sometimes obtained by a system of channels having a square cross section, and that approximately follow the shape of the part. This solution is used in special cases and is known to be used only on simple geometrical shapes (mainly on cylindrical punches). Such a solution gives rise to the problem of sealing between the attached parts, resulting in substantial delays and manufacturing costs.

Such channels are most often produced by drilling, which is the least effective but simplest solution. Since the holes can be drilled only in a straight line, an entire series of drilling operations is necessary in order to follow the impression as closely as, possible. The circuit is then formed by using fluid-tight plugs, or even by using external bridging arrangements for difficult cases, which are best avoided to the extent possible due to the risk that the resulting circuits can be crushed or broken while the mold is being handled.

Insufficient cooling can result either due to geometrical precision problems or excessively long cycle times. In the worst cases, this can cause production shutdowns, during which the mold is left open to be regulated by natural convection.

Despite all of these risks of malfunction, this aspect of the tool is often neglected when designing molds for injection molding. The regulating system is very often designed as the last item, and must be placed between the various ejectors, the guiding column, etc. This has been found to be erroneous because this function is the keystone of the injection molding process. The conditions for cooling the part play an essential role in the level of internal stresses in the injection-molded parts and in the crystallinity of the polymer, and therefore, in the aging stability and the mechanical properties of the parts. Consequently, production of the cooling/regulating channels currently represents a major challenge in improving performance in plastics processing.

One solution which has been proposed is disclosed in an article in the journal "*Emballages Magazine*" entitled "How to Optimize the Molding of Plastics" (January-February 2002, supplement No. 605). The disclosed solution entails the production of a first, prototype mold, the behavior of which is observed and recorded during cooling. A computer then analyzes the data and deduces the dimensions and the positions of pins intended to improve heat exchange. This method leads to the construction of a second mold which is more effective than the first mold, and which includes a set of pins placed in accordance with a design established by the computer. Such a solution is time-consuming and requires prior experimentation.

Another solution which has been proposed is disclosed in International Publication No. WO 02/22341. The disclosed solution places a tubular insert provided with radially disposed pins inside a parison, in order to increase the heat exchange. The application of this solution is limited, and complicated to implement.

The object of the present invention is to alleviate the aforementioned drawbacks of the prior art and to provide an entirely novel method for designing and manufacturing the tool and its fluid transport circuit.

SUMMARY OF THE INVENTION

In accordance with the present invention, the tool and its fluid transport circuit are designed and manufactured in a fully optimized manner, and in accordance with the requirements of the part to be produced, using the process known by the trademark "STRATOCONCEPTION" which is disclosed in European Patent No. 0 585 502, and improvements of which are disclosed in French Patent Publications No. FR 2,789,188, FR 2,789,187, FR 2,808,896, FR 2,809,040 and in French Patent Application No. FR 02/80514, the contents of which are fully incorporated by reference as if fully set forth herein.

In general, the "STRATOCONCEPTION" process relates to a method for producing a mechanical part based on a computer-aided design. In a preliminary step, the body of the part is broken down into elementary strata. The elementary strata are then manufactured, followed by reconstruction of the part in its entirety by superposing and assembling the manufactured strata.

During break-down of the part, at least one fluid transport circuit is broken down into elementary chambers in accordance with the break-down associated with that of the part. The fluid transport circuit is designed and modeled beforehand, and the elementary chambers are produced in the elementary strata of the part during manufacture of the strata. The fluid transport circuit is then reconstructed, in its entirety, during superposition and assembly of the strata.

As an alternative, and during break-down of the part, an additional isolating circuit can be broken down into elementary isolating chambers in accordance with the break-down associated with that of the part. The elementary isolating chambers are produced in the elementary strata of the part during manufacture of the strata. The isolating circuit is then reconstructed during superposition and assembly of the set of strata.

Further in accordance with the present invention, a mechanical part is provided which is comprised of a body with at least one fluid transport circuit. The fluid transport circuit is, for example, comprised of channels produced in the body and at a predetermined distance from a heat exchange surface. The circuit is produced by the above-described methods, and is reconstructed in its entirety during assembly of the strata, based on a succession of elementary chambers that are brought into communication in a fluid-tight manner and that are provided in at least one portion of the strata. The fluid transport circuit is preferably filled with a fluid selected from the group of fluids including a heat exchange fluid, a thermal insulation fluid, a liquid or pulverulent material, and a marking fluid.

In some embodiments, and after reconstruction, the circuit forms a set of channels in the body of the part which are preferably parallel and which follow or copy a molding surface at a predetermined distance from the molding surface. In other embodiments, and after reconstruction, the circuit forms a layer-shaped chamber in the body of the part. The circuit preferably includes a connection to a regulating device.

As a further alternative, the part can further include an additional isolating circuit, which is also reconstructed in its entirety during assembly of the strata. The additional isolating circuit is based on a succession of elementary chambers that are brought into communication in a fluid-tight manner, and are provided in at least one portion of the strata.

Further description of the present invention is given below, with reference to the following drawings.

DETAILED DESCRIPTION OF PREFERRED EMBODIMENTS

Figure 1:
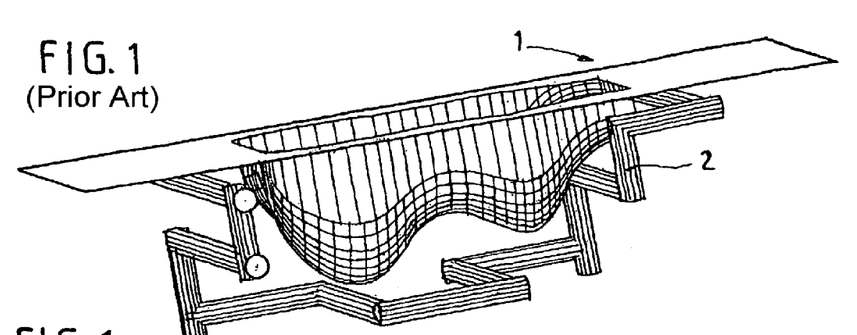
FIG. 1 is a three-dimensional view of a mold with prior art cooling channels.
Figure 1A:
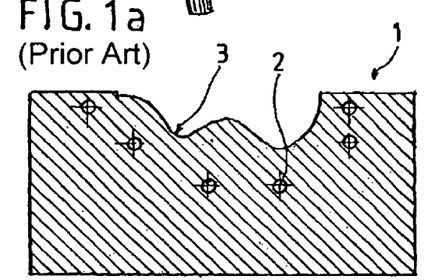
FIG. 1a is a vertical section of the mold of FIG. 1.

FIG. 1 shows the conventional principle of cooling a mold (1). Several regulating channels (2) are produced by drilling and/or by the use of plugs, to form a three-dimensional network of regulating channels (2). The regulating channels (2) are parallel to the molding surface (3) of the mold (1), which is shown in FIG. 1a, after the molding tool has been manufactured. The regulating channels (2) are placed at locations that are generally defined empirically by the mold designer.

Figure 2A:
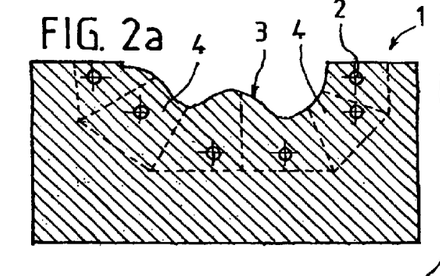
FIGS. 2a and 2b illustrate the principle of breaking down the mold of FIG. 1a into unitary cells.
Figure 2B:
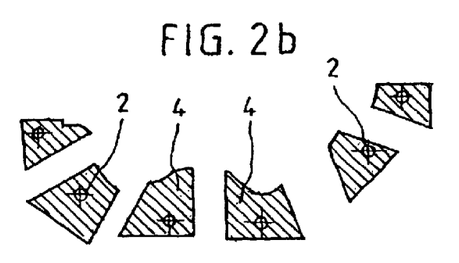

FIGS. 2a and 2b schematically show the basic concept of the present invention. In accordance with the present invention, and to make it easier to space the channels and to determine their dimensions, the region of the mold which surrounds the molding surface (3) which will be in contact with the material to be molded and which will consequently be subjected to heating and cooling stresses during production of the part, is broken down into elementary cells (4) over a given thickness. For ease of understanding, FIGS. 2a and 2b schematically show such a break-down into unitary thermal cells for the conventional mold shown in FIG. 1. The break-down shown in FIGS. 2a and 2b is only one of the break-downs that can be employed to facilitate the determination of the dimensions of the channels.

In accordance with the present inventive concept, each cell is determined so that the cell is traversed by at most one regulating channel. The positions and the dimensions of the channels which are thereafter calculated will depend on the thermal stresses that the affected region of the mold will have to undergo during the various operations for producing the part (molding, blowing, cooling, demolding, etc.).

Figure 10:
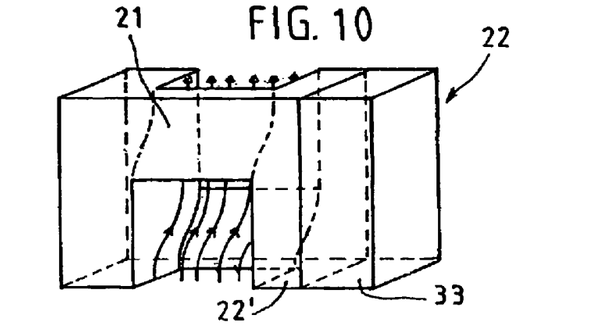
FIG. 10 is a representation of a unitary thermal cell of a regulating follower layer.

The foregoing inventive concept for designing and producing optimized regulating channels is performed using the "STRATOCONCEPTION" process previously referred to. The design of the channels derives from prior modeling, in terms of unitary thermal cells, but this is not to be taken as limiting. As an example, a unitary cell (22) (see FIG. 10) is formed, over a given thickness, from a part of the mold (22') in contact on one of its faces with the polymer to be cooled, from a part of this polymer (33), and from a unitary chamber (15) in which the fluid circulates.

Figure 3:
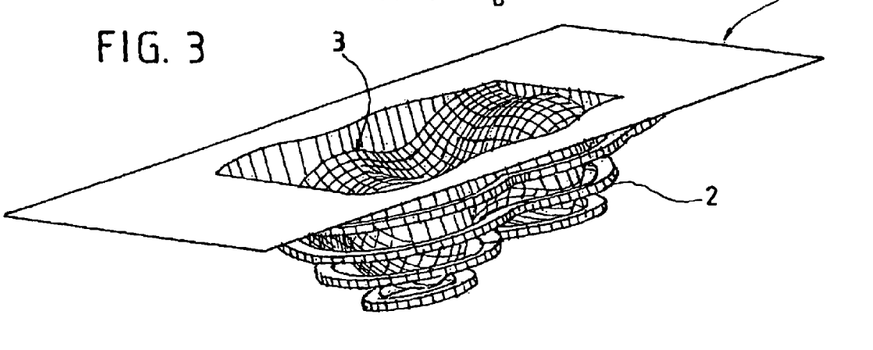
FIG. 3 is a three-dimensional view of a mold which has been stratified, in accordance with the present invention, and which includes follower-axis channels for the circulation of a regulating fluid that follows the shape of the molding surface.
Figure 3A:
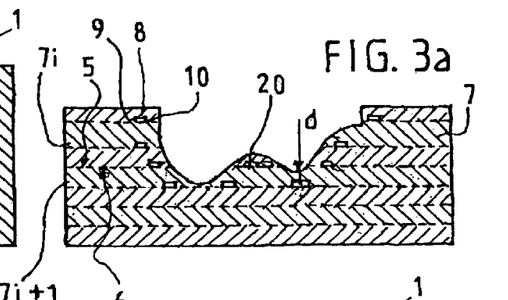
FIGS. 3a and 3b are vertical sections of the mold of FIG. 3, and its break-down into unitary cells.
Figure 3B:
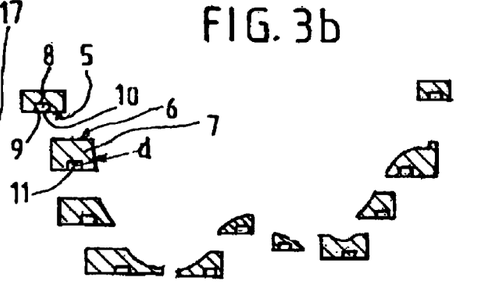

FIGS. 3, 3a and 3b show a first application of the foregoing basic principles to a stratified mold produced using the "STRATOCONCEPTION" process (or one of its improvements). In this application, the mold (1) is produced using software that breaks the mold down into elementary strata (7). The strata (7) are produced by micromilling a plate. The strata (7) are then joined together by superposing the strata so that one of the inter-stratum planes of the stratum ($7_i$) is applied against one of the inter-stratum planes of the next stratum ($7_{i+1}$).

In accordance with the present invention, each stratum in regions of the mold concerned with heat exchange is calculated to include a regulating channel (2) that emerges in one of the inter-stratum planes (either the upper plane of a stratum or the lower plane of a stratum). The requirements of the part, for example, the cycle time, the characteristics of the material, etc., will dictate the dimensions of the channels (2). The channels are dimensioned or designed beforehand, according to the requirements of the application, and are produced by micromilling during production of the strata. The channels (2) are then reconstructed in their entirety upon assembly of the strata.

The embodiment shown in FIGS. 3a and 3b includes at least one channel (2) of square cross-section in the stratum, or in the strata (7) of the mold region in question. The channel has a plane bottom (8) parallel to the inter-stratum plane, and two side walls (9, 10) perpendicular to the inter-stratum plane (5 or 6) from which the channel (2) emerges. Such an embodiment is referred to as a "follower axis" embodiment because the longitudinal axis (11) of the channel is located at a predetermined distance (d) from the molding surface (3). Such an embodiment makes it easier to cut the channel (2) in a stratum (7) of the series ($7_i$, with i from 1 to n), by laser or by water-jet micromilling. Providing a cross-section with a square or rectangular base also improves the heat exchange compared with a circular cross-section.

Figure 4:
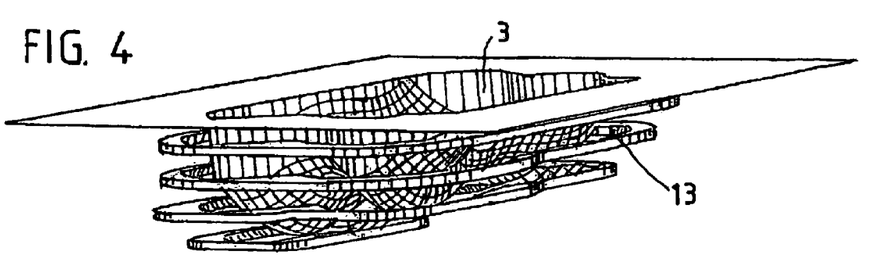
FIG. 4 is a three-dimensional view of a mold which has been stratified, in accordance with the present invention, and which includes follower-surface channels for fluid circulation.
Figure 4A:
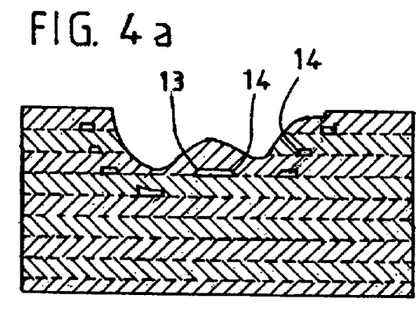
FIGS. 4a and 4b are vertical sections of the mold of FIG. 4, and its break-down into unitary cells.
Figure 4B:
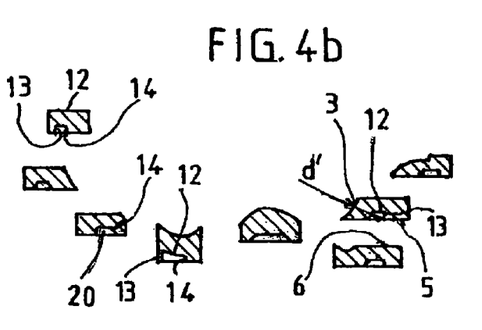

The embodiment shown in FIGS. 4, 4a and 4b includes a channel (2), at least one of the side walls (13, 14) of which is shaped to reproduce or copy a portion of the molding surface (3). Such an embodiment is referred to as a "follower surface" embodiment because all the points on the follower side wall (for example, the wall (14) shown) are located at a distance (d') from the molding surface (3), with the bottom (12) and the other side wall (13) remaining parallel, or optionally, perpendicular, respectively, to the inter-stratum plane (5 or 6).

For the embodiments shown in FIGS. 3a to 4b, the channels are produced by turning the strata over and by providing the channels with a depth less than the thickness of one stratum. It is to be understood that such embodiments are nonlimiting examples, and that the channels can have other shapes, and a depth greater than the thickness of one stratum.

The corners between the walls and the bottom of the channels are "broken" to limit stress concentrations. The channels follow the molding surface at a predetermined depth (d') that is constant, or that varies, depending on the region to be cooled or the cooling requirements.

The position of a channel in the interface plane of a stratum ($7_i$) is calculated so that, when the strata ($7_i$) are being stacked, the channel is blocked by the interface plane of the next stratum ($7_{i+1}$), so that there is no overlap between the two emerging channels. The size and cross-section of the channels is calculated according to the amount of heat to be removed.

Figure 5:
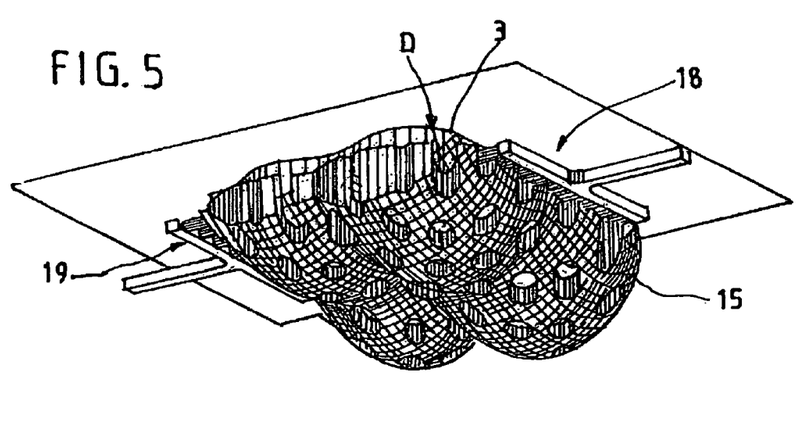
FIG. 5 is a three-dimensional view of a mold which has been stratified, in accordance with the present invention, and which includes a follower layer for the circulation of a regulating fluid which follows or copies the shape of the molding surface.
Figure 5A:
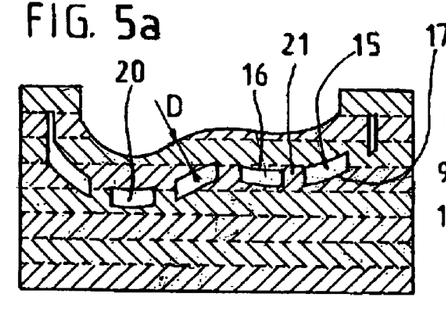
FIG. 5a is a vertical section of the mold of FIG. 5.
Figure 6:
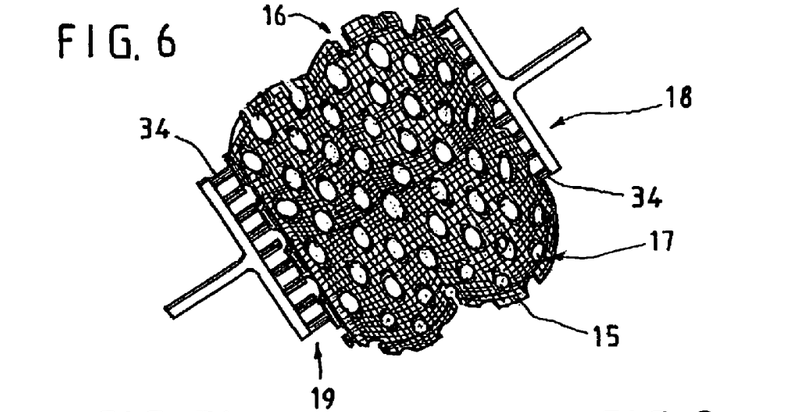
FIG. 6 is a nonlimiting representation of the follower layer.

In another embodiment of the present invention, shown in FIGS. 5 and 6, the mold (1) includes a fluid circulation layer (15) that follows or copies the shape of the molding surface. This follower layer has a predetermined thickness and is bounded by a surface (16) facing the molding surface (3) and a surface (17) facing toward the outside of the mold. The follower layer is predetermined so that all points of the surface (16) facing the molding surface are at a predetermined distance or depth (D) from the molding surface (3), which is why this circulation layer has been called a follower layer. The distance (D) is constant, or can vary, depending on the region to be cooled or the thermal stresses. Such a fluid layer constitutes a true, continuous thermal barrier surrounding the part to be produced. The follower layer (15) has been exemplified by a solidified fluid, which is shown in isolation in FIG. 6, with a feed header (18) for inflow of the regulating fluid and a fluid outlet header (19).

As in the previous illustrative examples, the mold is produced by a "STRATOCONCEPTION" process. In each stratum which is involved in the heat exchange, a portion of the circuit, which will be referred to as an "elementary chamber" (20), is produced during the micromilling step, and the circuit is then formed in its entirety after all of the strata have been superposed.

Figure 7A:
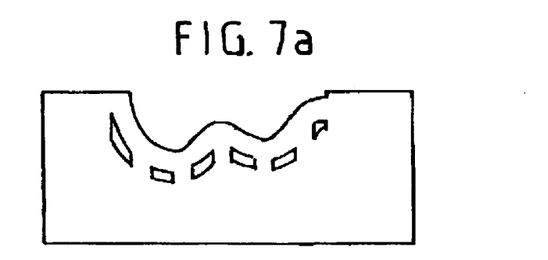
FIGS. 7a and 7b are representations of two successive strata defining the follower layer of FIG. 6.
Figure 7B:
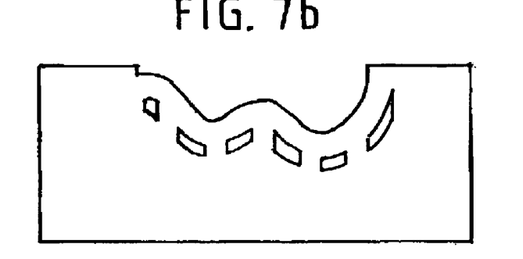

The two strata ($7_i$) and ($7_{i+1}$) of the mold that surround or define the chamber for circulating the fluid of the follower layer of FIG. 6 have been shown in FIGS. 7a and 7b. Such a fluid layer constitutes a true, continuous thermal barrier surrounding the part to be produced. The corners between the faces and the bottom of the chamber are also broken, to limit stress concentrations and head losses.

Figure 8:
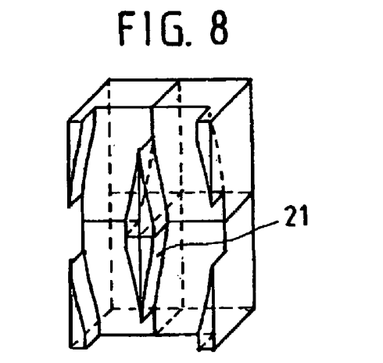
FIG. 8 is a partial, nonlimiting representation of a stratum that includes fins for producing a laminar effect in the follower layer.
Figure 9:
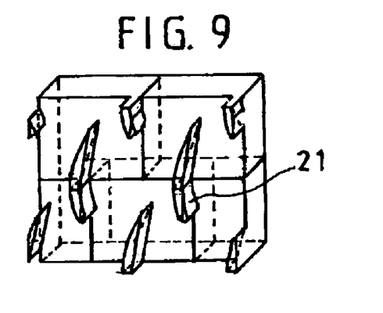
FIG. 9 is a partial, nonlimiting representation of a stratum that includes fins for producing a turbulent effect in the follower layer.

A multiplicity of transverse fins (21) can further be provided inside the chamber, for mechanical reinforcement between the two walls and for stirring the fluid. The fins can be of various shapes depending on the application and the desired effects, for example, a laminar effect (see FIG. 8) or a turbulent effect (see FIG. 9). The shape, size and cross-section of the fins depend on the amount of heat to be removed and on the requirements due, for example, to the mechanical stresses (join radius between the fins and the faces of the layer, etc.).

The follower layer (15) can be broken down into unitary heat exchange cells (22) for the purpose of mathematically modeling all of the heat exchanges undergone or transmitted by the mold during the production of a part. A unitary exchange cell (22) is individually illustrated in FIG. 10 and is shown diagrammatically on one of the strata ($7_{i+1}$) in FIG. 7b. The various characteristic parameters of the virtual base cell (22) are used, in accordance with the present invention, for mathematically calculating in optimum manner the dimensions of the part and of the circuit before they are produced. This is done, using techniques which are otherwise known, by writing heat balance equations using analytical models and/or multiphysical numerical simulations.

Figure 11:
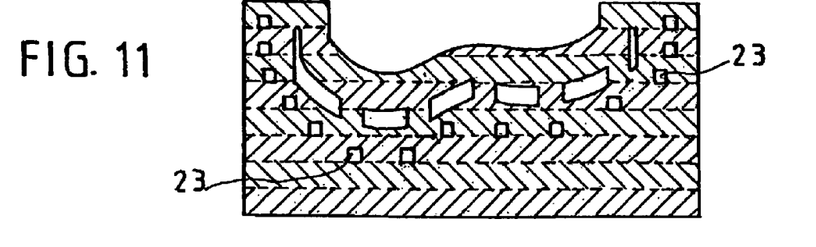
FIG. 11 is a schematic section of a mold which has been stratified in accordance with the present invention, and which includes isolating follower channels.
Figure 12:
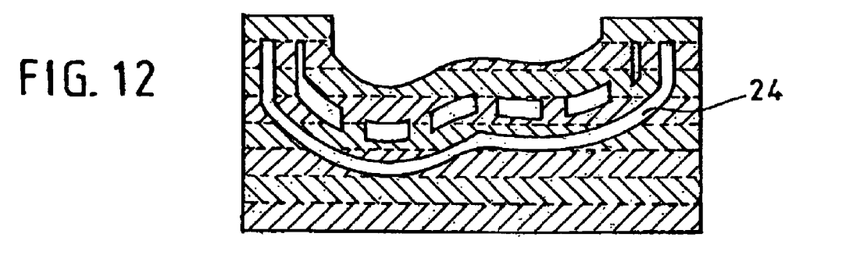
FIG. 12 is a schematic section of a mold which has been stratified in accordance with the present invention, and which includes an isolating follower layer.

Two further embodiments are shown in FIGS. 11 and 12, which operate to limit the thermal conduction toward the sides of the mold (convective losses with the outside) and/or toward the bottom of the mold (conductive losses with the machine frame). These molds include, respectively, a plurality of isolating follower channels (23) (FIG. 11), and parallel to the isolating follower channels (23), an isolating follower layer (24) (FIG. 12). Such embodiments can also be produced during the micromilling step of the "STRATOCONCEPTION" process, and can be designed in the same way as the regulating follower channels (2) or the regulating follower layer (15).

The isolating channels (23) and the isolating layer (24) are located at a constant, or at a variable distance from the regulating follower layer (15), and are located on the outside of the follower layer (15), placing them between the follower layer (15) and the outside of the mold (the side and bottom faces). The dimensions and the cross-sections of the isolating channels (23) and the isolating layer (24) depend on the isolation to be provided, and are also obtained from multiphysical numerical simulations. For example, the isolating channels (23) and the isolating layer (24) are thicker when they are close to the machine platens than when they are close to the external faces, since the losses by conduction into the platens are greater than the losses by natural convection relative to the external faces. The isolating channels and layers form either an active isolation, or secondary regulation, or a passive isolation if they are filled with an insulating material.

Figure 13:
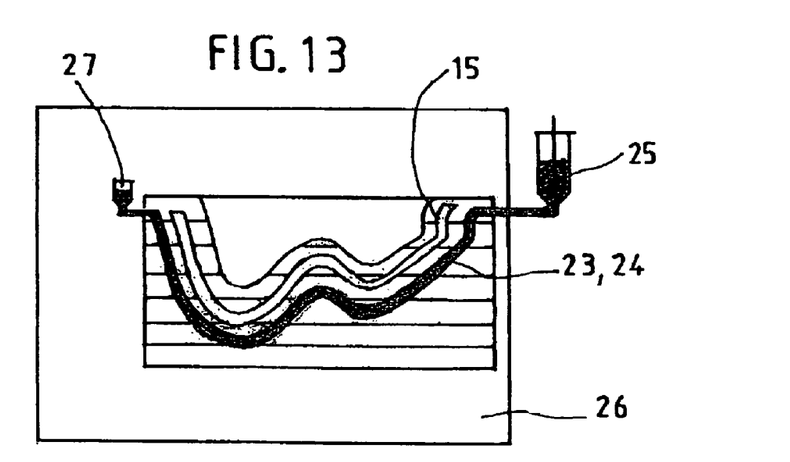
FIG. 13 is a diagram of a method of filling the isolating layer or channels.

FIG. 13 schematically shows a method of filling a mold with an insulating resin (25) in a vacuum chamber (26), for achieving passive isolation. A volume of resin (25) is introduced under an air vacuum into the internal volume. The volume of resin (25) is greater by a few percent (owing to shrinkage) than the internal volume of the channels or the layer to be filled. A telltale (27) is used to ensure complete filling.

Figure 14:
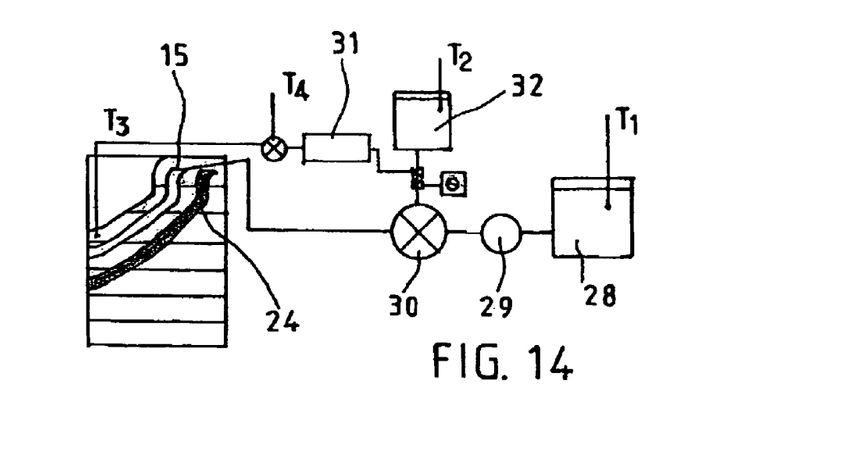
FIG. 14 is a diagram of a dynamic regulating device in accordance with the present invention.

FIG. 14 shows an example of an active thermal regulating device for operating on the regulating fluid circulating in a follower layer (15) which is externally isolated by an isolating layer (24). The cooling fluid (28), at a temperature ($T_1$), is sent by a pump (29) into the chamber (20) of the follower layer (15). If necessary, a solenoid valve (30) controlled by a regulator (31) mixes a colder liquid (32) at a temperature ($T_2$) with the cooling liquid (28). Such mixing will depend on the measured difference between a temperature ($T_3$) measured in the mold region lying between the molding surface (3) and a reference temperature ($T_4$) chosen for the regulation being performed.

Moreover, to obtain a molding tool suitable for withstanding the mechanical stresses to be encountered, a mechanical brace can be provided during the bonding of the strata. This includes an application of mechanical adhesive on the regions extending from the channels, as far as the outside of the mold, and an application of adhesive with a predetermined thermal conductivity on the regions extending from the cooling circuits, as far as the molding surface. The term "cooling circuit" is to be understood to mean both the network of channels and the layer construction.

In general, the method of the present invention ensures that the strata are held in place in a technically and economically suitable manner for the intended application by the choice of a technique for assembling the strata, namely, adhesive bonding, brazing, screwing or the like.

The method of the present invention makes it possible to cause regulation of the tools to comply with the requirements of the parts to be produced, allowing very fine regulation in the case of high-performance parts, or active regulation in the case of consumer parts. This serves to optimize regulation of the tools, to improve the productivity of the tools, to optimize the mechanical strength of the parts being produced, to reduce geometrical distortion, to reduce internal stresses due to cooling, to reduce the internal stresses due to filling, to reduce thermal inertia of the tools, and to reduce their weight.

Furthermore, it is possible to produce bulk or crude items (preformed or otherwise) dedicated to a part, with the optimized system of channels already produced. Each stratum is seen as an independent solid. As a consequence, one is concerned only with the heat supplied to the stratum, and the channel is dimensioned in this way.

Hotspots can, therefore, be treated with greater care. Any imbalances in cooling, due to the mold/material contact conditions and/or difficulties of gaining access between the die and the punch, can be eliminated.

At any point in the impression, heat removal is optimized. It is possible to achieve uniform cooling (in terms of flux, temperature, heat transfer coefficient) over the entire surface of the part, while still ensuring a cooling time which is adjusted to the shortest possible, or minimum cooling time, and while nevertheless limiting the residual stresses and deformations in the part.

Due to the low inertia of the mold, it is possible to control the cooling dynamically. Consequently, it is possible to heat the mold, after ejection of the part, to keep the mold hot until the end of the filling operation, and to then cool the mold. Mold cooling is started slightly before the end of a filling, depending on the reaction time of the tool itself (a very short time due to the reduced inertia of such tools). By improving the filling operation, its duration is shortened, making it easier for the polymer to flow. The level of internal stresses in the injection-molded part is also reduced.

The combination of optimized cooling with dynamic control of the thermal regulation of the mold allows the cycle time to be reduced by decreasing the filling time and the cooling time. This combination also allows the internal stresses in the injection-molded parts to be considerably reduced, which reduces distortion and post-shrinkage of the parts, and which increases the dimensional quality and improves the aging behavior of the parts. Irrespective of the type of cooling desired, the dimensional, structural and mechanical qualities of the injection-molded parts are improved, whether the parts are high-performance products, attractive products or consumer products.

Heat transfer is optimized by cell modeling, charts and the simulations used to choose each regulating parameter. The positioning and the dimensions of the fins influence the heat transfer, the mechanical strength of the tools, and the control of turbulence (header losses, etc.). Such positioning must, therefore, be studied and optimized using numerical simulation and optimization tools.

The design of the feed headers (18) and the outlet headers (19) is key for regulating fluid flow control. This design is also simulated and numerically optimized (for example, with reference to FIG. 6, by providing wider or more numerous nozzles (34) at the necessary points).

The time needed to bring the tools into service (to temperature) is shortened. The weight of such tools is also reduced.

The mold has a low thermal inertia due to thermal and mechanical optimization of the wall thickness between the follower layer and the molding surface. The thermal inertia of the mold can also be increased by the isolating action of the second layer, if necessary. As a result, the volume to be regulated is optimal. Minimal inertia gives the tools a greater production capacity. This is because the regulating time is not only optimized, but the tool returns more rapidly to its initial conditions in order to start a new cycle.

Of course, the examples and/or applications described above do not limit the scope of the present invention.

In particular, the present invention extends to many other known fields of application, namely metal foundry work, the building industry, the printing industry or others. Depending on requirements, the fluid chosen can be a liquid, a gas or a powder, and can be used, for example, for purposes of heat exchange, for isolation, for marking, for plugging and/or for assembly and/or rigidification by solidification (or other processes, etc.).

Moreover, and for the sake of simplification and clarity, while the above-described break-down operations have been performed in parallel planes, this is in no way limiting, and such operations can also be performed in warped surfaces. It should also be mentioned that break-down of the circuit or circuits is tied to that of the part, in the sense that this can be identical, or tied by a mathematical relationship.

Finally, while the term "cell" has been used with various qualifiers, the term intellectually denotes the same concept.

The invention claimed is:

1. A method for producing a mold by computer-aided design including a preliminary step in which body portions of the mold are broken down into elementary strata, followed by steps including manufacture of the elementary strata to form manufactured strata and reconstruction of the mold by superposing and assembling the manufactured strata, wherein the method comprises the steps of:

defining a fluid transport circuit in the mold;
breaking down the fluid transport circuit into a plurality of elementary chambers as part of the break-down of the mold and during the break-down of the mold;
producing the elementary chambers in the manufactured strata during the manufacture of the manufactured strata; and
completely reconstructing the fluid transport circuit during the superposition and the assembly of the manufactured strata;
breaking down an isolating circuit coupled with the fluid transport circuit into a plurality of elementary isolating chambers as part of the break-down of the mold and during the break-down of the mold;
producing the elementary isolating chambers in the manufactured strata during the manufacture of the manufactured strata, simultaneously producing the elementary chambers and the elementary isolating chambers during the manufacture of the manufactured strata;
reconstructing the isolating circuit during the superposition and the assembly of the manufactured strata, wherein the elementary isolating chambers are placed in fluid-tight communication, simultaneously producing the fluid transport circuit and the isolating circuit; and
combining the elementary isolating chambers of the isolating circuit to form a thermal barrier between the fluid transport circuit and side and bottom portions of the mold.

2. The method of claim 1 wherein the elementary chambers are produced in the manufactured strata before the manufactured strata are reconstructed to form the fluid transport circuit.

3. The method of claim 1 which further includes the step of combining the elementary chambers of the fluid transport circuit to form a cooling circuit in the body of the mold.

4. The method of claim 3 which further includes the step of combining the elementary chambers of the fluid transport circuit to form a three-dimensional network of channels in the body of the mold.

5. The method of claim 3 which further includes the step of combining the elementary chambers of the fluid transport circuit to form a layer-shaped chamber in the body of the mold.

6. The method of claim 1 wherein the step of producing the elementary chambers in the manufactured strata further includes the step of forming the elementary chambers in surface portions of the manufactured strata, to a depth which is less than a defined thickness of the manufactured strata.

7. The method of claim 6 which further includes the step of combining the elementary chambers of the fluid transport circuit with surface portions of adjacent manufactured strata, to form the fluid transport circuit.

8. The method of claim 1 which further includes the step of forming the thermal barrier as a continuous thermal barrier.

9. The method of claim 8 which further includes the step of combining the elementary isolating chambers of the isolating circuit to form a network of follower channels in the body of the mold.

10. The method of claim 8 which further includes the step of combining the elementary isolating chambers of the isolating circuit to form a layer-shaped chamber in the body of the mold.

11. The method of claim 1 which further includes the step of uniformly spacing the isolating circuit from the fluid transport circuit.

12. The method of claim 1 which further includes the step of providing the isolating circuit with a uniform thickness.

* * * * *